(12) United States Patent
Shim et al.

(10) Patent No.: US 8,221,714 B2
(45) Date of Patent: Jul. 17, 2012

(54) METHOD FOR THE PREPARATION OF TITANIUM NITRIDE POWDER

(75) Inventors: Jae-Hyeok Shim, Seoul (KR); Ji-Woo Kim, Suwon-si (KR); Young-Whan Cho, Seoul (KR); Woo-Sang Jung, Seoul (KR); Dong-Ik Kim, Seoul (KR); Seung-Cheol Lee, Seongnam-si (KR)

(73) Assignee: Korea Institute of Science and Technology, Seoul (KR)

( * ) Notice: Subject to any disclaimer, the term of this patent is extended or adjusted under 35 U.S.C. 154(b) by 879 days.

(21) Appl. No.: 12/209,468

(22) Filed: Sep. 12, 2008

(65) Prior Publication Data

US 2009/0226723 A1     Sep. 10, 2009

(30) Foreign Application Priority Data

Mar. 7, 2008   (KR) ................ 10-2008-0021399

(51) Int. Cl.
*C01B 7/00*     (2006.01)

(52) U.S. Cl. ......... 423/411; 423/179.5; 423/80; 423/84; 501/96.1

(58) Field of Classification Search .............. 423/84, 423/179.5, 411, 499.3, 80; 501/96.1
See application file for complete search history.

(56) References Cited

U.S. PATENT DOCUMENTS 5,110,768 A * 5/1992 Kaner et al. .............. 501/1

OTHER PUBLICATIONS

Parkin et al., "A convenient, rapid, low-energy route to crystalline TiN, VN and TixVyN(x+y=1)" J. Materials Science Letters 12, 1993, pp. 1856-1857.*

* cited by examiner

*Primary Examiner* — Steven Bos
(74) *Attorney, Agent, or Firm* — Ladas & Parry LLP

(57) ABSTRACT

Nano-sized titanium nitride powder can be prepared by a simple process comprising subjecting mixed powder of titanium trichloride and lithium nitride to high-energy ball milling using a plurality of balls in an airtight reactor vessel under an inert gas atmosphere to form composite powder, and recovering the titanium nitride powder therefrom.

8 Claims, 3 Drawing Sheets

METHOD FOR THE PREPARATION OF TITANIUM NITRIDE POWDER

CROSS REFERENCE TO RELATED APPLICATIONS

This application claims priority from Korean patent application No. 10-2008-0021399 filed on Mar. 7, 2008, all of which is incorporated herein by reference in its entirety for all purposes.

FIELD OF THE INVENTION

The present invention relates to a method for preparing nano-sized titanium nitride powder in a cost-effective manner.

BACKGROUND OF THE INVENTION

Titanium nitride (TiN) has good abrasion-resistance, good high temperature-oxidation-resistance, high high-temperature strength and high elastic modulus, and accordingly, it is widely used for the manufacture of cutting tools, bulletproof materials, and abrasion-resistant and heat-resistant coatings. The finer the crystallite size of titanium nitride is, the better the hardness and toughness of the sintered titanium nitride products.

Titanium nitride powder is generally synthesized by reacting titanium with gaseous nitrogen at high temperature of 1000° C. or higher for a prolonged time.

This method, however, is hampered by the problems that it requires expensive equipments for the high temperature reaction and that the high temperature reaction which promotes particle size growth is not suitable for the preparation of nano-sized titanium nitride powder.

SUMMARY OF THE INVENTION

Accordingly, it is an object of the present invention to provide an effective and simple method for preparing nano-sized titanium nitride powder.

In accordance with one aspect of the present invention, there is provided a method for preparing titanium nitride (TiN) powder, which comprises subjecting mixed powder of titanium trichloride and lithium nitride to ball milling using a plurality of balls in an airtight reactor vessel under an inert gas atmosphere to form composite powder of titanium nitride and lithium chloride, and recovering the titanium nitride powder therefrom.

BRIEF DESCRIPTION OF THE DRAWINGS

The above and other objects and features of the present invention will become apparent from the following description of the invention, when taken in conjunction with the accompanying drawings, which respectively show.

DETAILED DESCRIPTION OF THE INVENTION

The method of the present invention comprises (1) subjecting mixed powder of titanium trichloride ($TiCl_3$) and lithium nitride ($Li_3N$) to high-energy ball milling using a plurality of balls in an airtight reactor vessel under an inert gas atmosphere to form composite powder, and (2) recovering desired titanium nitride (TiN) powder from the composite powder. A schematic diagram of the inventive process for preparing a titanium nitride powder is shown in FIG. 1.

Figure 1:
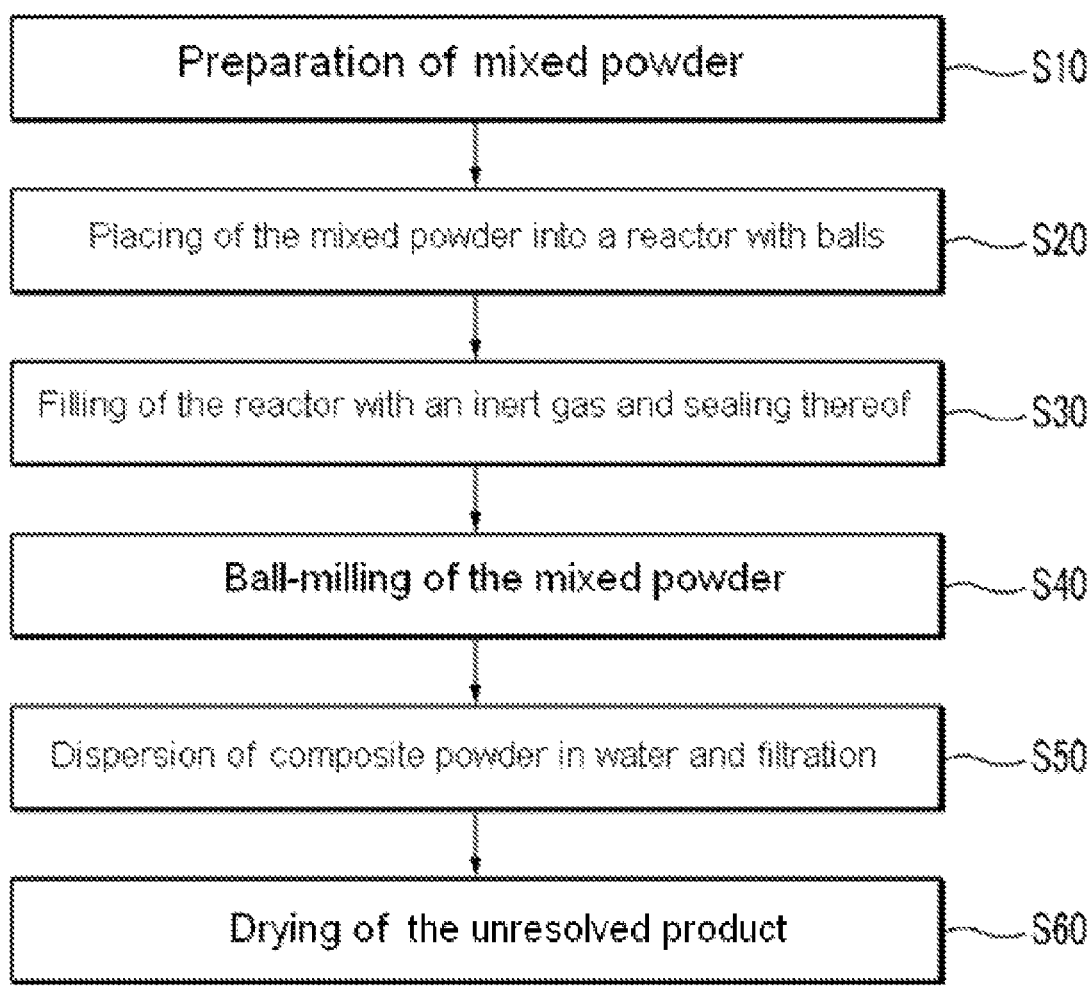
FIG. 1: a schematic processing diagram for the preparation of titanium nitride powder in accordance with one embodiment of the inventive method.

Referring to FIG. 1, the titanium nitride powder is obtained through the steps of: mixing the titanium trichloride powder and the lithium nitride powder (S10); placing the mixed powder into a reactor vessel together with a plurality of balls (S20); filling the reactor vessel with an inert gas and then sealing it (S30); subjecting the mixed powder to high-energy ball milling to form composite powder of titanium nitride and lithium chloride (S40); dispersing the composite powder in water and separating the unresolved product by filtration (S50); and drying the unresolved product (S60). Hereinafter, the above-mentioned steps will be explained in detail.

In step (S10), the titanium trichloride powder and the lithium nitride powder are mixed preferably in a molar ratio of 1:1, which corresponds to a stoichiometric ratio based on the reaction formula [$TiCl_3 + Li_3N \rightarrow TiN + 3LiCl$].

Then, in step (S20), the mixed powder formed in step (S10) is put to the reactor vessel together with a plurality of balls. The inner wall of the reactor vessel and the balls may be made of tool steel, stainless steel, cemented carbide (WC—Co), silicon nitride ($Si_3N_4$), alumina, or zirconia. The balls may have a diameter ranging from 5 to 30 mm and they may be used in an amount ranging from 1 to 30 g based on 1 g of the mixed powder.

In step (S30), the reactor vessel is filled with the inert gas and then sealed. The inert gas which functions to prevent explosion or oxidation by subsequent high-energy ball milling may be argon, hydrogen, nitrogen or a mixture thereof.

In step (S40), the mixed powder is subjected to high-energy ball milling to form the composite powder, wherein the high-energy ball milling may be conducted using a shaker mill, a vibratory mill, a planetary mill or an attritor mill. The high-energy ball milling brings out a mechanical-chemical reaction among the mixed powders, thereby inducing an interaction between the titanium trichloride and lithium nitride powders to generate the composite powder consisting of titanium nitride and lithium chloride powders.

The mixed powder and ball weight ratio of 1:1~30 leads to more effective high-energy ball milling. When the weight ratio of the balls is less than 1, the intensity of the ball-milling is weak and the desired chemical reaction cannot be achieved. In addition, when it is more than 30, a part of the inner wall of the reactor vessel or the ball can be incorporated into the mixed powder as a contaminant due to the high intensity ball milling.

The high-energy ball milling may be conducted for 1 to 10 hrs. When the time of the ball-milling is less than 1 hr, the reaction between the titanium trichloride and lithium nitride powders is unsatisfactory. In contrast, when it is more than 10 hrs, a part contaminant of the inner wall of the reactor vessel or the ball can be incorporated into the mixed powder.

After the completion of the ball milling, the sealed reactor vessel is opened to discharge gaseous hydrogen generated during the reaction, and then the composite powder is drawn out.

In step (S50), the composite powder consisting of the titanium nitride and the lithium chloride powders is dispersed in water, wherein the lithium chloride powder is completely dissolved in water, whereas the titanium nitride powder is not dissolved in water and is present as a solid therein. Subsequently, the resulting dispersion is subjected to filtration, thereby separating the undissolved product, titanium nitride, therefrom.

In step (S60), the titanium nitride powder is recovered by drying the unresolved product. The drying process may be performed by heating the undissolved product at about 100° C. for 2 to 3 hrs or by keeping it in a vacuum chamber.

The inventive titanium nitride powder thus obtained may have an even smaller particle size of 100 nm or less, as compared to the conventional micro-sized titanium nitride powder. Such nano-size of the inventive titanium nitride powder particles results from the function of lithium chloride that inhibits the growth of titanium nitride and the grinding effect by the ball-milling. The fine particle size of the inventive titanium nitride powder enhances the hardness and toughness of the sintered titanium nitride products as well as the catalytic performance of the reaction where titanium nitride is used as a catalyst.

As described above, the method of the present invention can be advantageously used for simple and economical preparation of nano-sized titanium nitride powder.

The following example is given for the purpose of illustration only, and is not intended to limit the scope of the invention.

EXAMPLE 1

Titanium trichloride ($TiCl_3$) and lithium nitride ($Li_3N$) powders were mixed in a molar ratio of 1:1 to form 3 g of a mixed powder. The mixed powder was placed into a 125 ml tool steel reactor and 19 cemented carbide (WC—Co) balls with a diameter of 9.5 mm were added thereto. The total weight of the used balls was 90 g. Then, the reactor vessel was filled with argon, sealed, and the mixed powder was subjected to high-energy ball milling using a planetary mill for 4 hrs to form composite powder. After the completion of the ball-milling, the sealed reactor was opened to discharge gaseous hydrogen generated during the reaction, and then the composite powder was dispersed in water. The resulting dispersion was filtered using a filtering paper to separate the unresolved product and the unresolved product was dried in a 100° C. oven for 2 hrs to obtain titanium nitride (TiN) powder.

Figure 2:
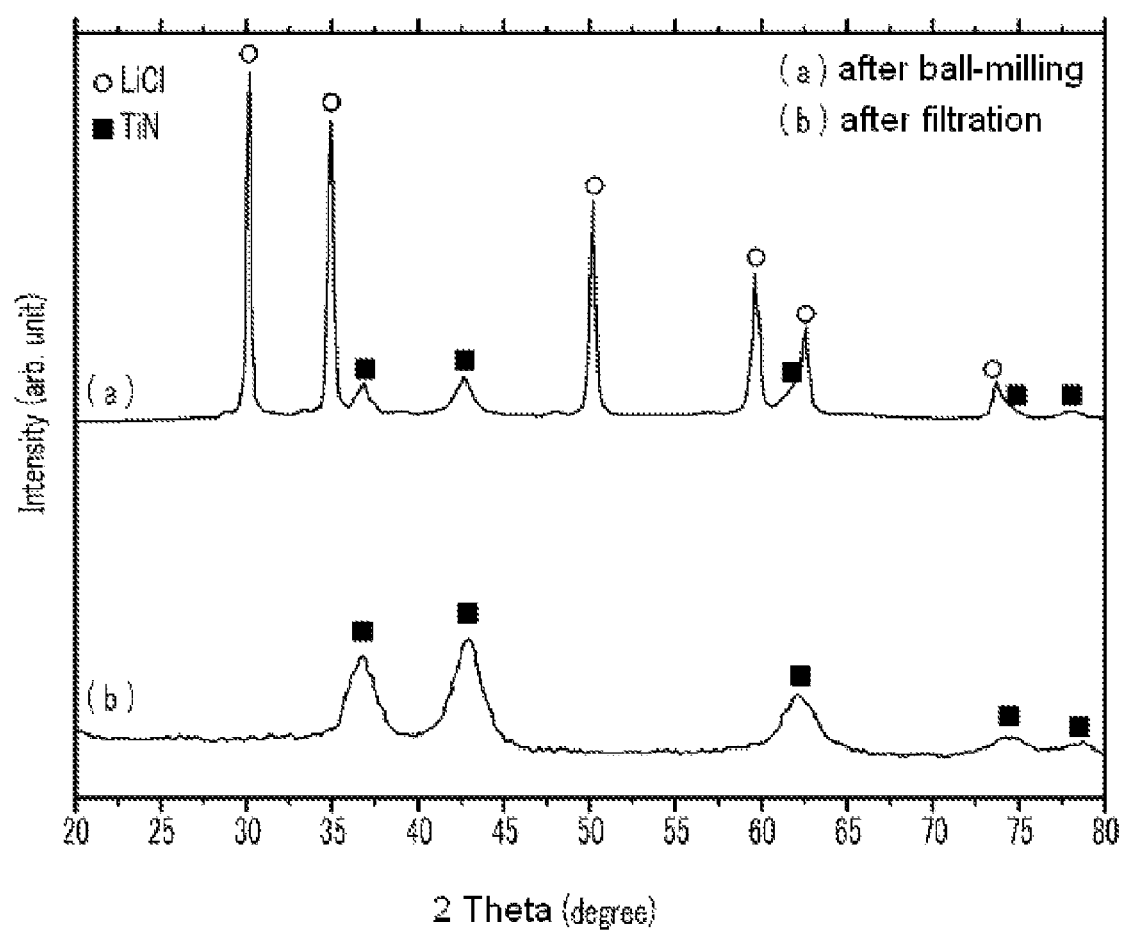
FIGS. 2A and 2B: X-Ray Diffraction (XRD) patterns of the composite powder (before filtration) and the titanium nitride powder (recovered by filtration), respectively, prepared in Example 1.

X-ray diffraction (XRD) pattern of the composite powder obtained before filtration and that of the titanium nitride powder recovered by filtration are shown in FIGS. 2A and 2B, respectively. In FIG. 2A, peaks of titanium nitride and lithium chloride are observed, while in FIG. 2B, only peaks of titanium nitride are detected, showing that the desired titanium nitride of a pure form was separated from the composite powder through filtration.

Figure 3:
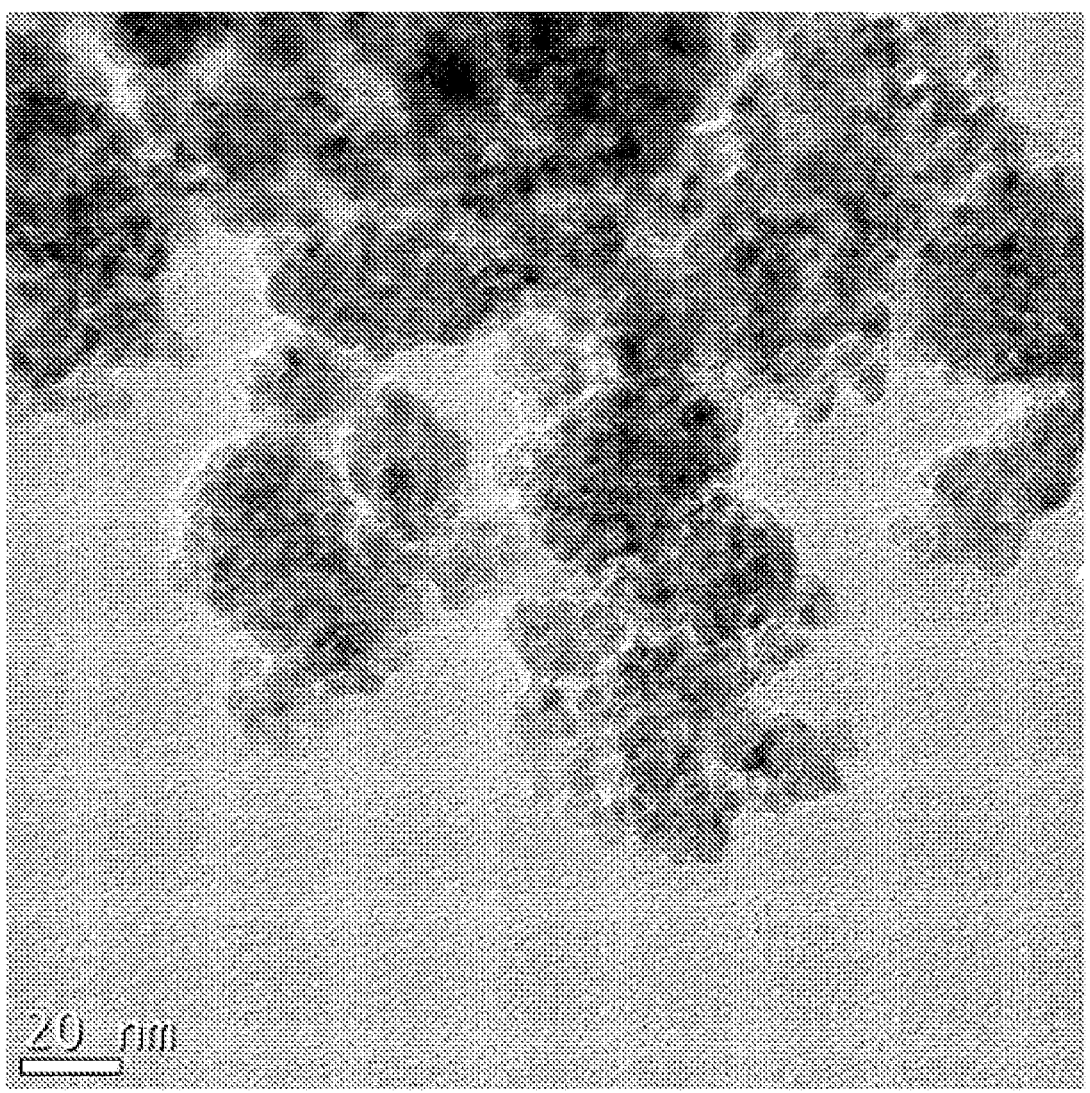
FIG. 3: Transmission Electron Microscope (TEM) photograph of the titanium nitride powder prepared in Example 1.

Transmission electron microscope (TEM) photograph of the separated titanium nitride powder thus obtained is presented in FIG. 3, which shows that the particle size of the powder is very fine, 100 nm or less, although the particle shape is irregular.

As described above, in accordance with the method of the present invention, nano-sized titanium nitride powder may be simply synthesized.

While the invention has been described with respect to the above specific embodiments, it should be recognized that various modifications and changes may be made to the invention by those skilled in the art which also fall within the scope of the invention as defined by the appended claims.

What is claimed is:

1. A method for preparing titanium nitride powder, which comprises subjecting mixed powder of titanium trichloride and lithium nitride to ball milling using a plurality of balls in an airtight reactor vessel under an inert gas atmosphere to form composite powder of titanium nitride and lithium chloride, and recovering the titanium nitride powder therefrom.

2. The method of claim 1, wherein the titanium trichloride powder and the lithium nitride powder are mixed in a molar ratio of 1:1.

3. The method of claim 1, wherein the ball milling is conducted using a shaker mill, a vibratory mill, a planetary mill or an attritor mill for 1 to 10 hrs.

4. The method of claim 1, wherein the inner wall of the reactor vessel and the balls are made of tool steel, stainless steel, cemented carbide, silicon nitride, alumina, or zirconia.

5. The method of claim 1, wherein the balls have a diameter ranging from 5 to 30 mm.

6. The method of claim 1, wherein the balls are used in an amount ranging from 1 to 30 g based on 1 g of the mixed powder.

7. The method of claim 1, wherein the inert gas is argon, hydrogen, nitrogen, or a mixture thereof.

8. The method of claim 1, wherein the recovery of the titanium nitride powder is performed by dispersing the composite powder in water, separating the undissolved product by filtration and drying the undissolved product.

* * * * *